United States Patent
Gretz

(10) Patent No.: US 7,176,377 B1
(45) Date of Patent: *Feb. 13, 2007

(54) ELECTRICAL BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/120,707

(22) Filed: May 3, 2005

(51) Int. Cl.
H01H 9/02 (2006.01)

(52) U.S. Cl. .............. 174/58; 174/53; 174/57; 174/481; 220/3.2; 220/3.3; 248/906

(58) Field of Classification Search ............. 174/48, 174/49, 50, 53, 57, 58, 480, 481, 502, 503; 220/3.2, 3.3, 3.4, 3.5, 3.6, 3.7, 3.8, 3.9, 4.02; 248/906, 343; D13/152; 439/535
See application file for complete search history.

(56) References Cited

U.S. PATENT DOCUMENTS

| 2,842,281 | A | | 7/1958 | Chisholm | |
|---|---|---|---|---|---|
| 3,620,404 | A | * | 11/1971 | Grasso | 174/48 |
| 4,842,155 | A | * | 6/1989 | Begin, Jr. | 220/3.6 |
| 4,918,259 | A | * | 4/1990 | Hanson | 174/66 |
| 5,042,673 | A | * | 8/1991 | McShane | 220/3.7 |
| 5,740,936 | A | | 4/1998 | Nash | |
| 6,338,225 | B1 | | 1/2002 | Hayes | |
| 6,417,447 | B1 | | 7/2002 | Bosse, Jr. | |
| 6,578,321 | B2 | | 6/2003 | Layne | |
| 6,596,938 | B2 | * | 7/2003 | Gilleran | 174/58 |
| 6,765,146 | B1 | * | 7/2004 | Gerardo | 174/58 |
| 6,878,877 | B1 | * | 4/2005 | Cozzi et al. | 174/53 |
| 6,956,172 | B2 | * | 10/2005 | Dinh | 174/58 |
| 7,087,837 | B1 | * | 8/2006 | Gretz | 174/58 |

* cited by examiner

Primary Examiner—Angel R. Estrada

(57) ABSTRACT

An assembly that enables easy mounting of an electrical box on an unfinished at a desired offset from the wall's eventual surface. The assembly includes an electrical box and a slide member. The slide member includes a flange having a rear surface, an opening therein, and arms extending rearwardly from the rear surface. The electrical box includes sidewalls having apertures therein, a front opening, a front edge, and a cavity for receiving an electrical device. The slide member is slideable with respect to the electrical box. A mounting arrangement is included on the flange for securing the slide member to the wall. A fastening and adjustment arrangement on the arms enables the box to be secured to the slide member and also enables easy adjusting of the offset of the front edge of the box from the wall surface.

6 Claims, 9 Drawing Sheets

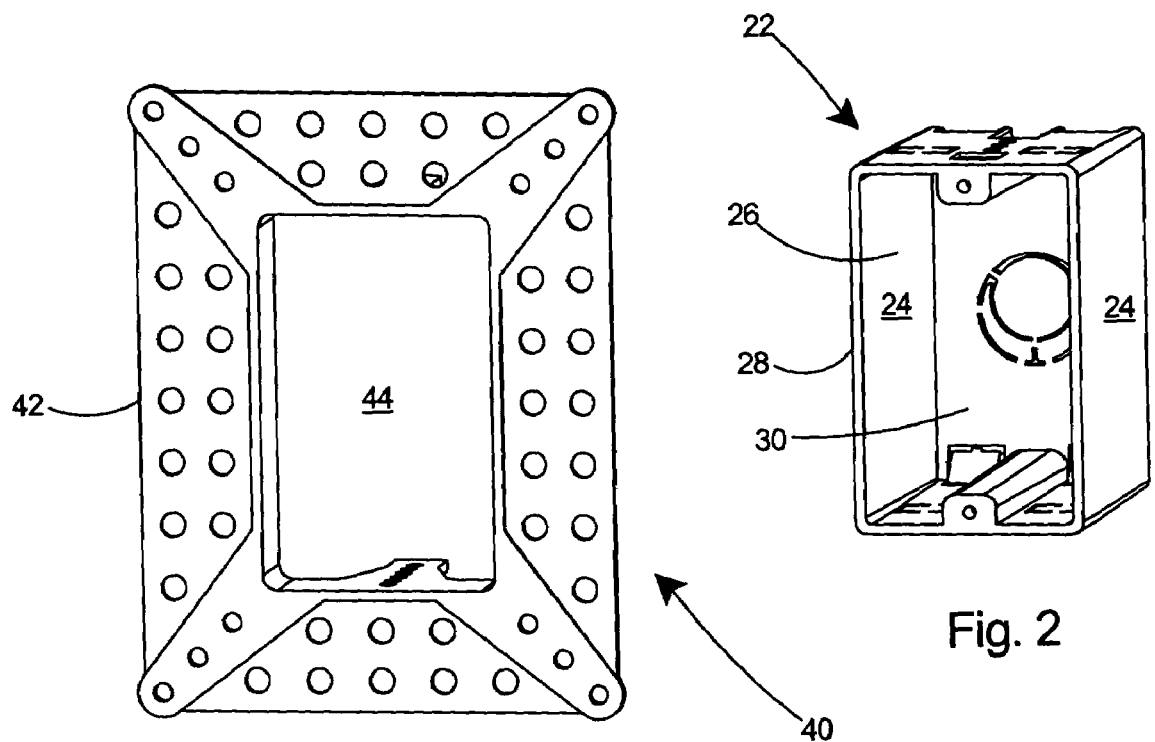
Fig. 2
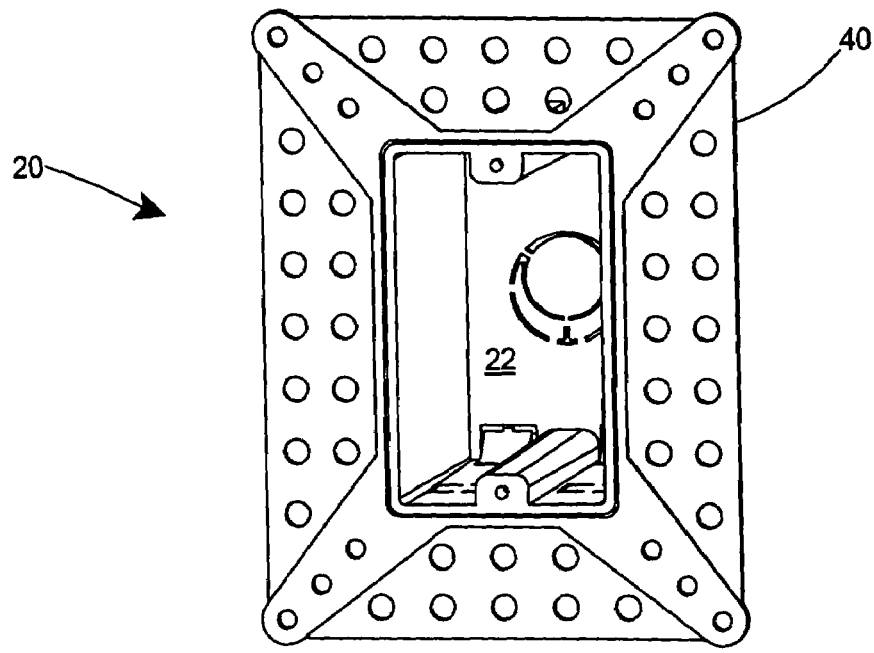
Fig. 1
Fig. 3

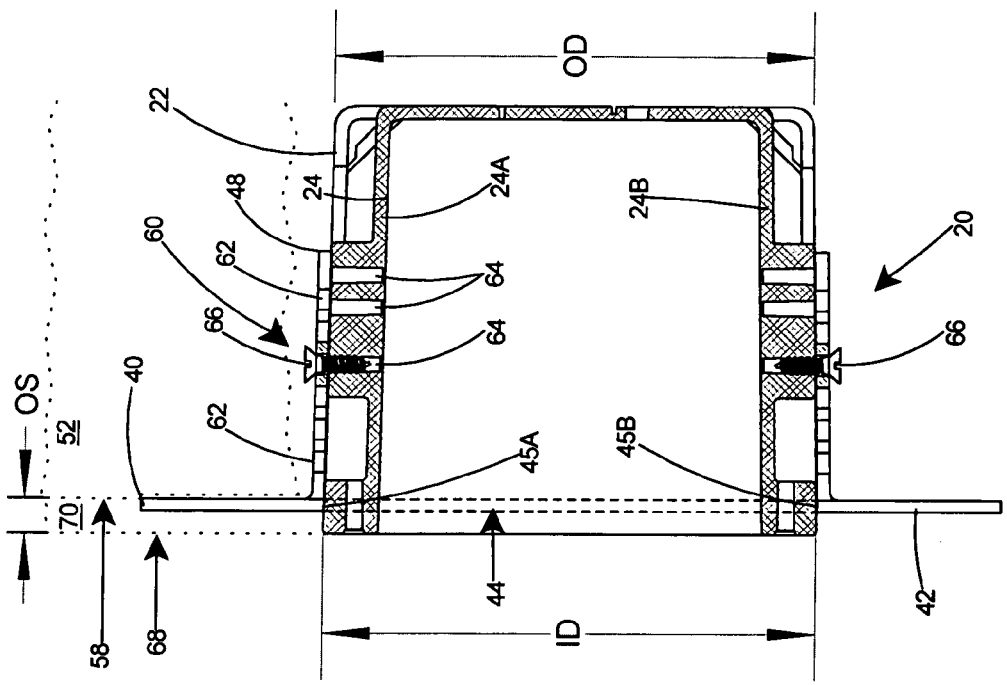
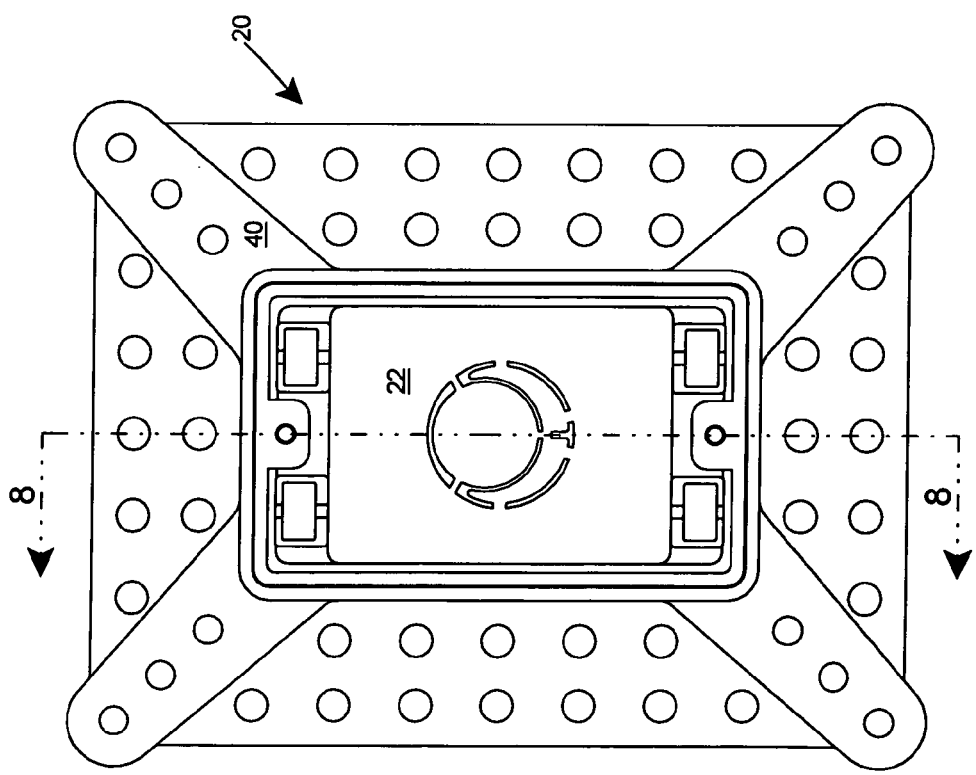

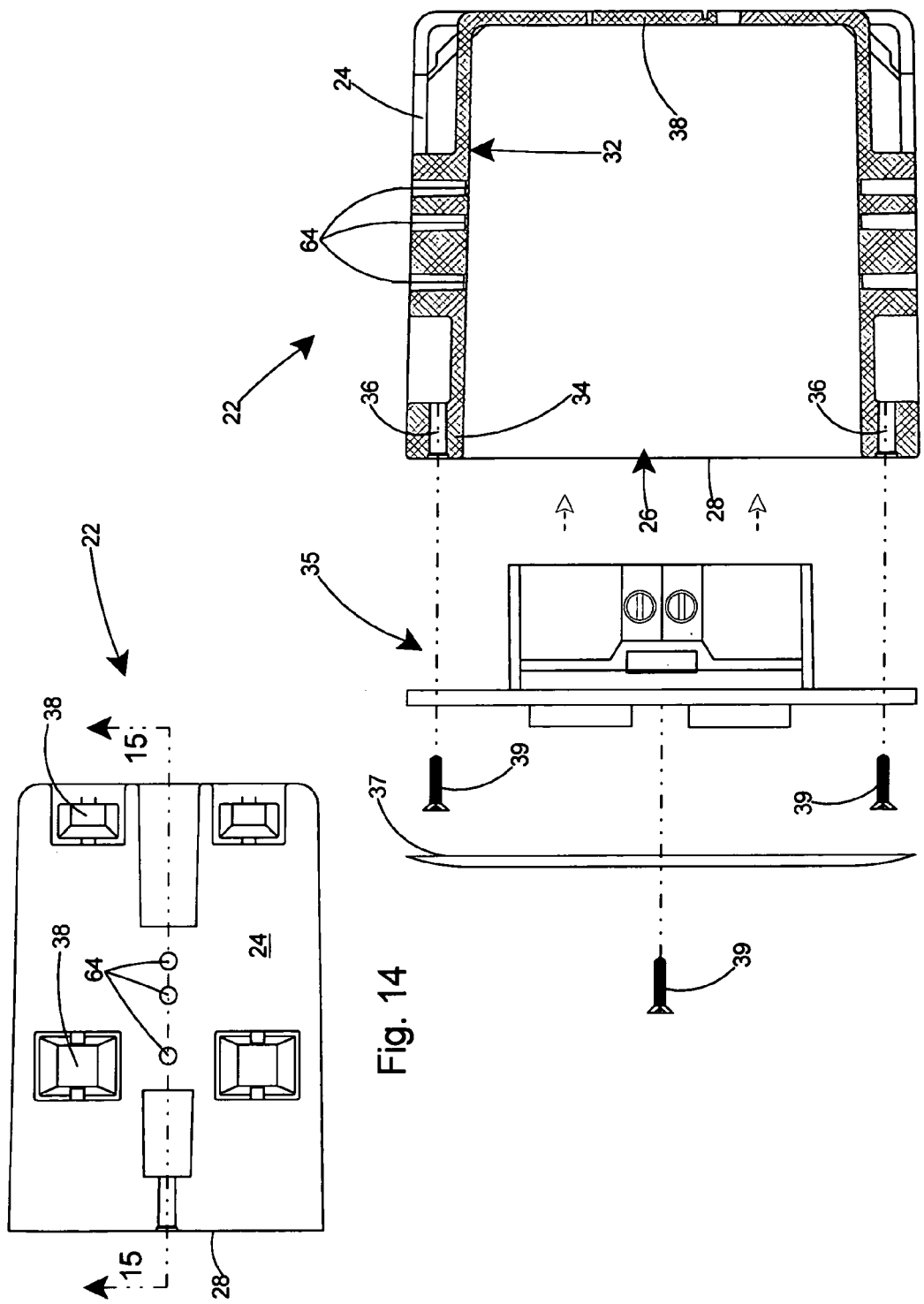

ELECTRICAL BOX ASSEMBLY

FIELD OF THE INVENTION

This invention relates to electrical junction boxes and specifically to an assembly that enables an installer to secure an electrical box to a block wall at a desired offset from the wall.

BACKGROUND OF THE INVENTION

Walls constructed of concrete blocks or bricks are frequently finished with materials such as stucco, paneling, siding, or similar materials. These finishing materials are installed to enhance the attractiveness of the wall.

To provide electrical services to the wall, electrical boxes are commonly secured to the wall prior to installing the finishing layer. Prior to installing the finishing layer, the installer typically breaks a hole in a block at the desired location for an electrical box. The hole, typically made with a hammer and chisel, is usually somewhat larger than the box. Furring strips are then typically secured to the surface of the block wall to provide a brace for accepting the fasteners of a standard electrical box. The electrical box is then placed within the furring strips and secured at the desired depth within the wall to accommodate the finishing layer that will later be installed thereon. The electrical box is therefore mounted in a position where its front edge will be even with the surface of the installed finishing layer. Since numerous finishing materials are available, and they are available in different thicknesses, it is a very cumbersome and difficult task to install the electrical box with a great degree of certainty that it will be approximately even with the eventual finished layer surface. Standard electrical boxes typically have nails or screws set an angle to the front edge of the box and they typically tend to shift the box as the fasteners are hammered or screwed into the furring strips. To seal against drafts, the oversize hole is typically filled in by blowing pressurized foam, such as polyurethane foam, into the space between the box and surrounding block surface to seal the space between the box and the block. After the foam has cured, portions of it typically extend outwards of the block wall and from the base of the electrical box.

This prior art method of installing an electrical device is illustrated in FIGS. 12 and 13. FIG. 12 depicts in exploded relationship an oversize hole 200 broken in the block wall 202, two furring strips 204 secured to the wall by fasteners 206, a prior art electrical box 208, a duplex receptacle 210, and a faceplate 212. The furring strips 204 are secured to the wall, the prior art electrical box 208 is secured to one of the furring strips 204 by a fastener 214, and a duplex receptacle 210 and a faceplate 212 are in alignment with the prior art electrical box 208. FIG. 13 depicts a completed installation of a prior art electrical box 208 to a block wall 202 including the furring strips 204 secured to the wall 202, the electrical box 208 secured to one of the furring strips 204, and cured polyurethane foam 216 that has been used to fill the hole. With reference to FIGS. 12 and 13, it should be apparent that this prior art method of providing an electrical box 208 on a block wall 202 is a tedious, labor intensive, time-consuming task that does not always result in the front edge 218 (see FIG. 12) of the electrical box being level with the eventual finished wall surface. In this prior art method of installing an electrical box to a block wall, it is difficult to get the proper offset from the anticipated surface of the later installed finished layer, as the prior art box is mainly intended for installation on framed walls, and the fasteners that come with the box are not positioned and angled to create a desired offset. The installer must therefore estimate the desired position of the electrical box to make it even with the finished wall.

What is needed therefore is a device that reduces the time and effort involved in installing an electrical box in a concrete block wall, brick wall, or similar surface, and enables the installer to easily mount the box at the desired offset from the wall's outer surface.

SUMMARY OF THE INVENTION

The invention is an assembly for mounting an electrical box on a wall such that the front edge of the box is at the desired offset from the wall's eventual surface. The assembly includes an electrical box and a slide member. The slide member includes a flange having a rear surface, an opening therein, and arms surrounding the opening and extending rearwardly from the rear surface. The electrical box includes sidewalls having apertures therein, a front opening, a front edge, and a cavity for receiving an electrical device. A mounting arrangement is included on the flange for securing the slide member to the wall. A fastening and adjustment arrangement is included on the arms for securing the box to the slide member and for adjusting the distance the front edge of the box is offset from the surface. The slide member is slideable with respect to the electrical box. A desired offset from the wall surface can be achieved by sliding the box within the slide member until the desired offset is achieved and then aligning guiding apertures in the slide member with receiving apertures in the box member and affixing a fastener therein to secure the box with respect to the slide member.

OBJECTS AND ADVANTAGES

The assembly of the present invention simplifies the process of mounting an electrical box in a concrete block wall. Much less time and effort are required to install the electrical box of the current invention than is required with conventional methods.

Another advantage provided by the assembly of the present invention is that it eliminates the need for furring strips to prepare a block wall for an electrical box. This greatly reduces the complexity of installing electrical boxes to a block wall.

The assembly of the present invention also enables an installer to easily and accurately achieve the desired offset from the wall's surface. This is of critical importance on those walls that will be covered with a finishing layer such as stucco.

These and other objects and advantages of the present invention will be better understood by reading the following description along with reference to the drawings.

DESCRIPTION OF THE DRAWINGS

FIG. 1 is a front perspective view of a preferred embodiment of a slide member that forms a portion of the assembly of the present invention.

FIG. 2 is a front perspective view of a preferred embodiment of an electrical box that forms another portion of the assembly of the present invention.

FIG. 3 is a perspective view of a preferred embodiment of the assembly of the present invention.

FIG. 7 is a front view of the assembly of FIG. 3.

FIG. 8 is a sectional view of the assembly taken along line 8—8 of FIG. 7.

FIG. 14 is a top view of the electrical box of FIG. 2.

FIG. 15 is a section view of the electrical box taken along line 15—15 of FIG. 14.

TABLE OF NOMENCLATURE

Figure 4:
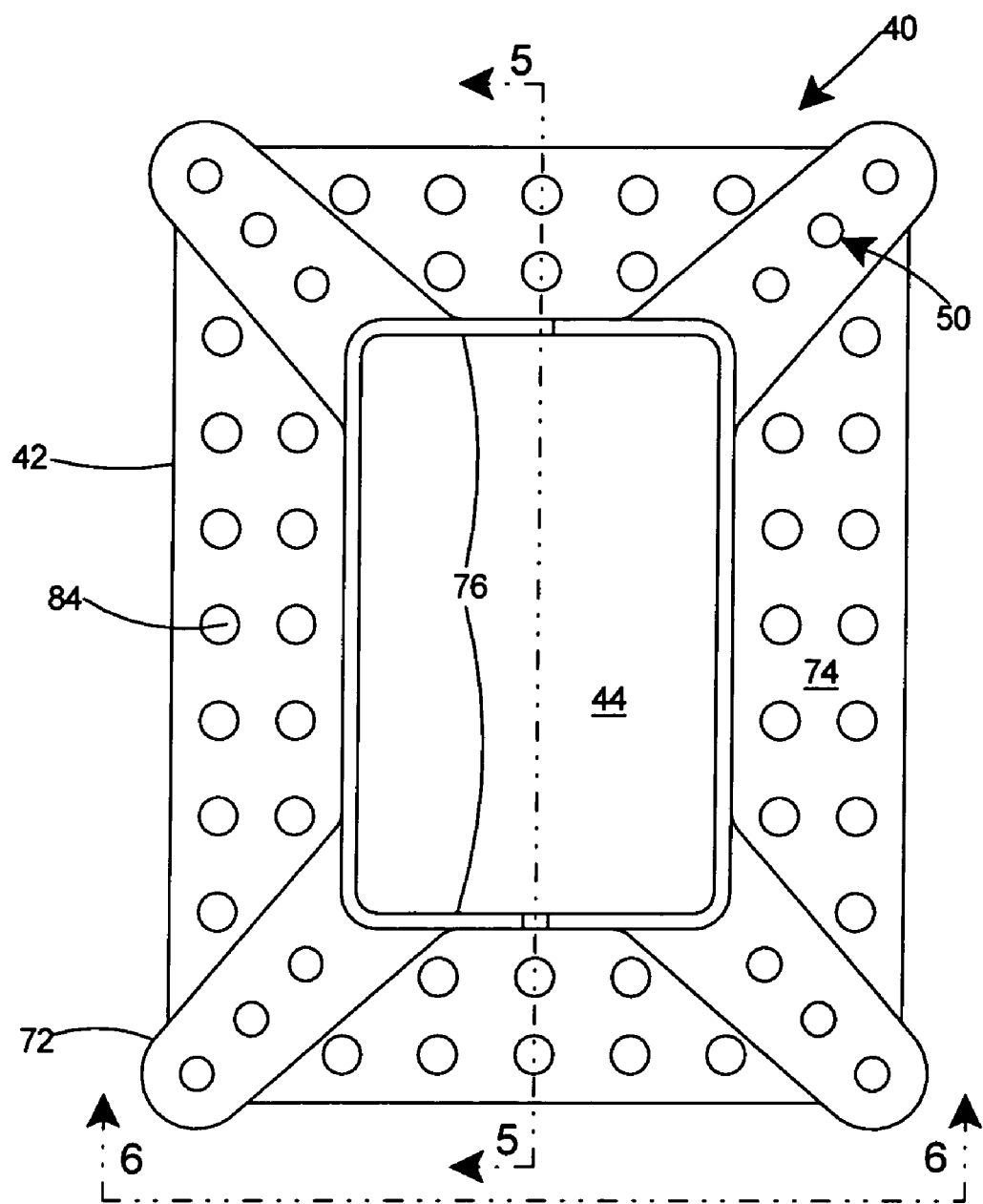
FIG. 4 is a front view of the slide member of FIG. 1.

The following is a listing of part numbers used in the drawings along with a brief description:

| Part Number | Description |
| --- | --- |
| 20 | electrical box assembly |
| 22 | electrical box |
| 24 | sidewalls |
| 24A, 24B | opposing sidewalls |
| 26 | front opening |
| 28 | front edge |
| 30 | cavity |
| 32 | inner surface of box |
| 34 | boss |
| 35 | duplex outlet |
| 36 | bore |
| 37 | faceplate |
| 38 | removable wall portion |
| 39 | fastener |
| 40 | slide member |
| 42 | flange |
| 44 | opening in flange |
| 45A, 45B | opposing sides of opening |
| 46 | rear surface of flange |
| 48 | arm |
| 48A | first arm |
| 48B | second arm |
| 50 | mounting arrangement |
| 51 | brace member |
| 52 | block wall |
| 54 | mounting aperture |
| 56 | mounting fastener |
| 58 | surface of unfinished wall |
| 60 | fastening and adjustment arrangement |
| 62 | guiding aperture |
| 64 | receiving aperture |
| 66 | fastener |
| 68 | finished surface |
| 70 | finishing layer |
| 72 | rib |
| 74 | web |
| 76 | opposing sides of opening in flange |
| 78 | first plane |
| 80 | second plane |
| 82 | center of guiding aperture |
| 84 | apertures in web |
| 86 | hole in wall |
| O1 | offset of front edge from wall's surface |

-continued

| Part Number | Description |
| --- | --- |
| O2 | offset of front edge from wall's surface |
| ID | inner dimension across opposing sides of opening |
| OD | outer dimension across opposing sidewalls of box |
| TR | thickness of rib |
| TW | thickness of web |
| 200 | oversize hole |
| 202 | block wall |
| 204 | furring strip |
| 206 | fastener |
| 208 | prior art electrical box |
| 210 | duplex receptacle |
| 212 | faceplate |
| 214 | fastener |
| 216 | foam |
| 218 | front edge of prior art electrical box |

DETAILED DESCRIPTION OF THE INVENTION

The present invention comprises an electrical box assembly for providing electrical service on a surface. It is especially useful on walls constructed of concrete block, brick, or similar materials.

With reference to FIGS. 1–3, the electrical box assembly 20 includes an electrical box 22 having sidewalls 24, a front opening 26, a front edge 28, and a cavity 30 for receiving an electrical device (not shown) therein.

Referring to FIGS. 14 and 15, the sidewalls 24 of the box 22 include an inner surface 32 and one or more bosses 34 integral with and extending from the inner surface 32 of the sidewalls 24 and having bores 36 therein. One or more removable wall portions 38 are provided in the sidewalls 24 of the electrical box 22. With reference to the sectional view of FIG. 15, a duplex outlet 35 is shown in alignment with the bores 36 in the electrical box 22 and a faceplate 37 in alignment with the duplex outlet 35 to be secured thereto with fasteners 39.

Figure 5:
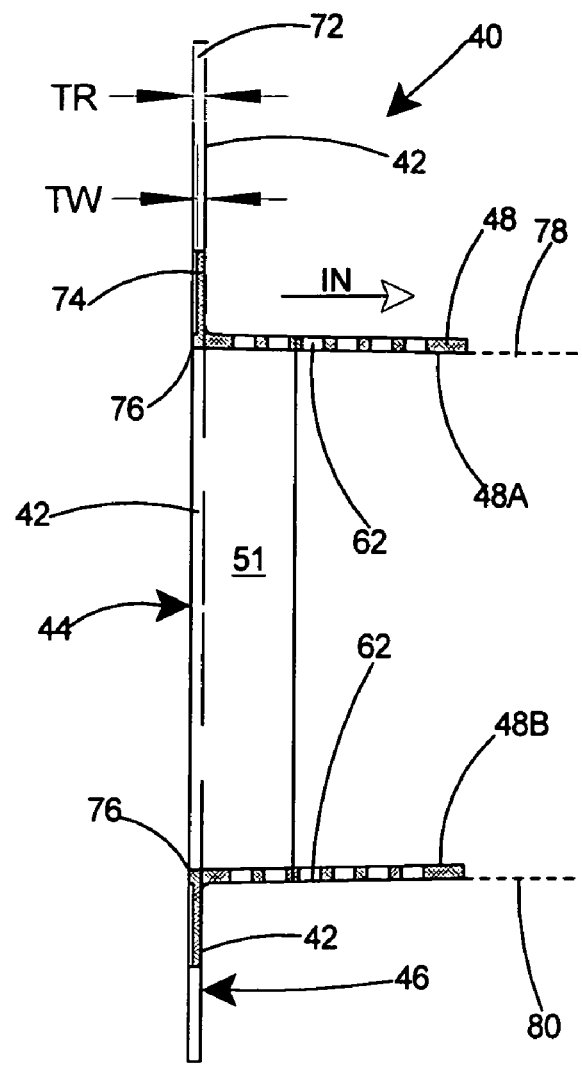
FIG. 5 is a sectional view of the slide member taken along line 5—5 of FIG. 4.
Figure 6:
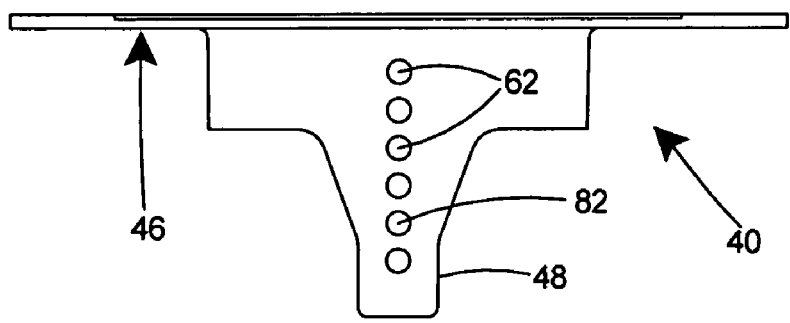
FIG. 6 is an end view of the slide member taken along line 6—6 of FIG. 4.

With reference to FIG. 1, the electrical box assembly 20 further includes a slide member 40 that includes a flange 42 and an opening 44 therein. As shown in FIGS. 4–6, the flange 42 includes a rear surface 46 and arms 48 integral with the flange 42 and extending inwardly (see IN arrow on FIG. 5) from the rear surface 46, with inwardly referring to the direction with respect to the wall (not shown) that the slide member 40 will be fitted into. The arms 48 preferably extend perpendicularly from the flange. A mounting arrangement 50 is included on the flange 42 for securing the slide member to a wall surface (not shown). Brace members 51 extend horizontally from each side of the opening 44 in the flange 42 and extend vertically between the arms 48 thereby stiffening and adding support to the arms 48 and bracing them in their parallel relationship to one another.

Figure 9:
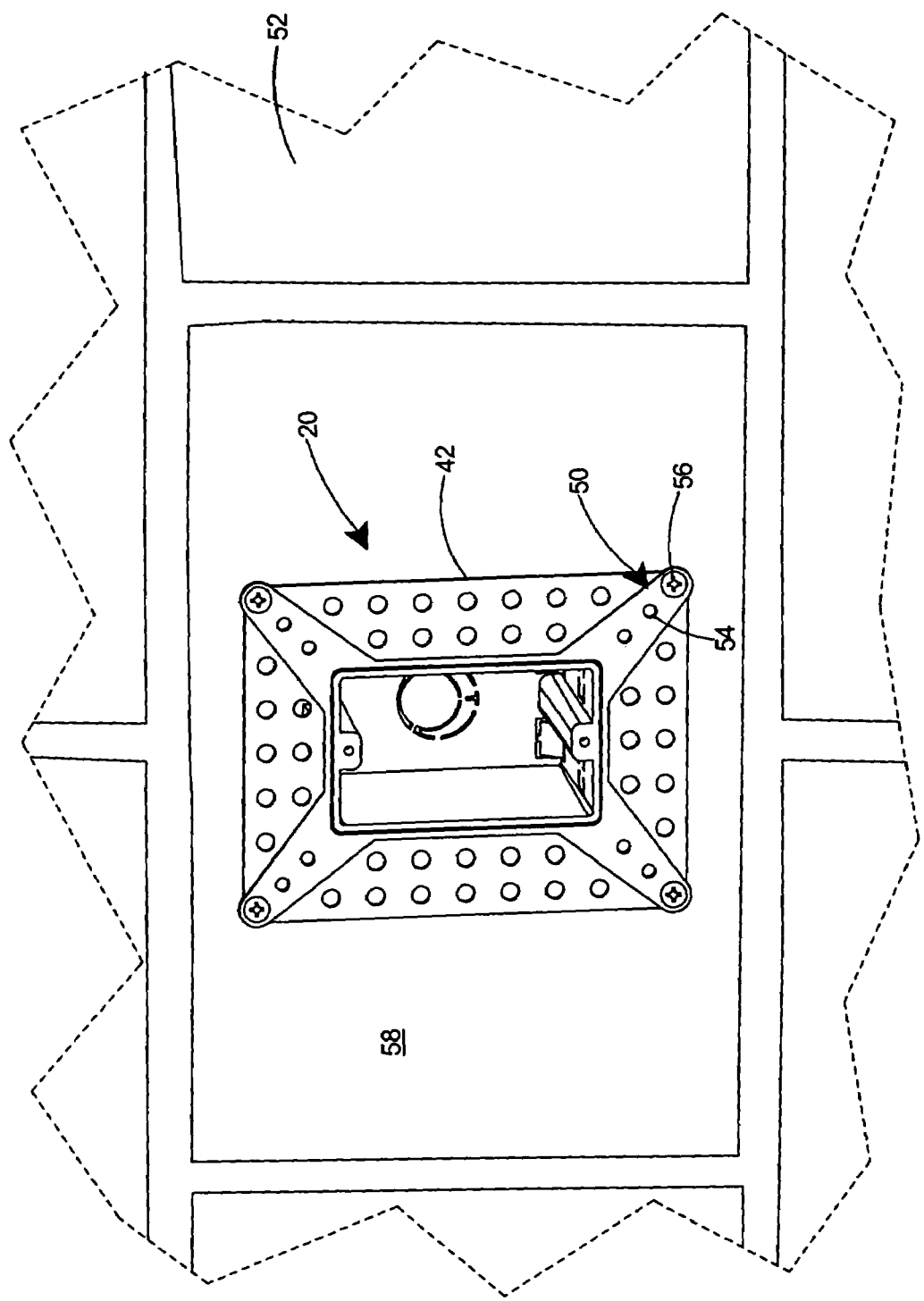
FIG. 9 is a perspective view of the electrical box assembly of the present invention installed on a block wall.

As shown in FIG. 9, which depicts the electrical box assembly 20 secured to a block wall 52, the mounting arrangement 50 includes mounting apertures 54 in the flange 42 and mounting fasteners 56 for securing through the mounting apertures 54 in the flange 42 and into the surface 58 of the wall 52.

With reference to FIG. 8, a fastening and adjustment arrangement 60 is included on the arms 48 and on the electrical box 22 for securing the box 22 to the slide member 40 and for adjusting the distance the front edge of the box is offset from the surface. The fastening and adjustment arrangement 60 includes a plurality of guiding apertures 62 in the arms 48, a plurality of receiving apertures 64 in the sidewalls 24 of the electrical box 22, and at least one fastener 66 associated with each of the arms 48 for securing through the guiding apertures 62 in the arms 48 into the receiving apertures 64 in the sidewalls 24 of the electrical box 22. It is preferred that the arms have a thickness of at least 0.050 inch to be structurally sound enough to provide stiffness with respect to the slide member 40 and also so that the arms 48 can structurally hold a fastener and also be stiff enough to prevent movement of the box 22 once they are secured thereto, such as in FIG. 8.

Referring to FIGS. 6 and 14, the guiding apertures 62 on the arms 48 are arranged longitudinally along the arms 48 in a linear alignment (FIG. 6) and the receiving apertures 64 on the electrical box 22 are arranged longitudinally along the sidewall 24 of the box 22 in a linear alignment (FIG. 14). When the electrical box 22 is inserted into the opening 44 in the flange 42, as shown in FIG. 8, the linearly aligned guiding apertures 62 in the arms 48 will be axially aligned with the receiving apertures 64 in the box 22. Only one fastener 66 is required per arm 48 to secure the electrical box 22 to the slide member 40. As the box 22 is slid with respect to the slide member 40, there will be numerous possible axial alignments between the guiding apertures 62 in the arms 48 and the receiving apertures 64 in the box 22. Therefore, the electrical box assembly 20 enables the setting of numerous offsets OS (FIG. 8) between the surface 58 of the unfinished wall 52 and the expected finished surface 68. The finishing layer 70 which will be installed on the wall dictates the expected finished surface 68. The finished layer can be various thicknesses of stucco, siding, paneling, or various other finishing materials. The electrical box assembly 20 of the present invention therefore provides an easy and rapid method of placing an electrical box at the exact desired offset from the unfinished wall.

After securing the slide member 40 to the electrical box 22 with the fastening and adjustment arrangement 60 as shown in FIG. 8, the electrical box assembly 20 consists of the slide member 40 and the electrical box 22 secured together as an integral unit as shown in FIG. 7.

With reference to FIG. 4, the flange 42 includes outward extending ribs 72 and a web 74 extending between each of the ribs 72. The webs 74 have a thickness TW and the ribs 72 have a thickness TR (see FIG. 5). The thickness of the ribs 72, which require structural strength to accept a fastener and hold the assembly 20 to a wall, is greater than the thickness of the webs 74. The webs 74 extend between the ribs 72 and provide a means of masking the irregular shaped hole that the assembly is typically fitted within. Preferably the web 74 extends outward at least 0.5 inch from the opening. As the webs 74 perform a masking function, they do not require the larger thickness of the ribs 72. As the preferred embodiment of the box 22 and slide member 40 of the present invention are typically each molded in one piece from plastic, minimizing the thickness of the webs 74 lowers production cost of the slide member 40. In the preferred embodiment, the thickness of the webs 74 is preferably between 0.020 and 0.070 inch and the thickness of the ribs is preferably between 0.075 and 0.120 inches.

Referring to FIGS. 4 and 5, the opening 44 in the flange 42, although it is not limited to a single shape, in the embodiment shown herein the opening 44 has a rectangular shape and two sets of opposing sides 76. The arms 48 are two in number and are typically adjacent the opening 44 in the flange 42. The arms 48 extend from each side of one of the sets of opposing sides 76. The arms 48 therefore include a first arm 48A and a second arm 48B in parallel planes 78 and 80 on opposing sides 76 of the opening 44 in the flange 42. Each guiding aperture 62 in the plurality of apertures in the first arm 48A is in axial alignment with a matching guiding aperture 62 in the plurality of apertures in the second arm 48B.

With reference to FIG. 8, the electrical box 22 typically includes opposing sidewalls 24A, 24B that have an outer dimension OD as measured across the opposing sidewalls 24A, 24B. The opening 44 in the flange 42 of the slide member 40 includes opposing sides 45A, 45B having an inner dimension ID as measured across the opposing sides 45A, 45B of the opening 44. The outer dimension OD across the opposing sidewalls 24A, 24B of the box is preferably between 0.001 and 0.030 inch larger than the inner dimension ID across the opposing sides 45A, 45B of the opening 44 in the flange 42. This is a critical dimension as the electrical box 22 must be slideable with respect to the slide member 40 but have enough clearance that the slide member 40 does not bind the box 22 and prevent it from sliding within the opening. As the arms 48 are parallel to one another, clearance between each arm 48 and the adjacent slide member 40 is also preferably between 0.001 and 0.030 inch.

With reference to FIG. 6, the guiding apertures 62 in the arms 48 each include a center 82. It is critical that the apertures 62 have a close enough spacing to enable a plurality of offsets with respect to the unfinished wall surface (not shown). It is preferred that the guiding apertures 62 in the arms 48 are spaced apart a distance of between 0.170 and 0.500 inch center to center.

With reference to FIG. 4, the web portions 74 of the slide member 40 preferably include a plurality of apertures 84 therein. The apertures 84 are provided in the web 74 enhance the adherence of stucco (not shown) when the stucco is applied thereto to finish the wall surface. The apertures in the web 74 preferably include a diameter of at least 0.125 inch and no greater than 0.500 inch.

The electrical box and the slide member are each molded in one piece from plastic. Suitable plastic materials for the box and slide member include polycarbonate, polyvinylchloride, polyethylene, polypropylene, or acrylonitrile butadiene styrene.

The offset of the front edge of the box from the unfinished surface is determined by the fastening and adjustment arrangement, which includes selection and alignment of one of the guiding apertures in the arms with one of the receiving apertures in the sidewalls of the electrical box.

Figure 11:
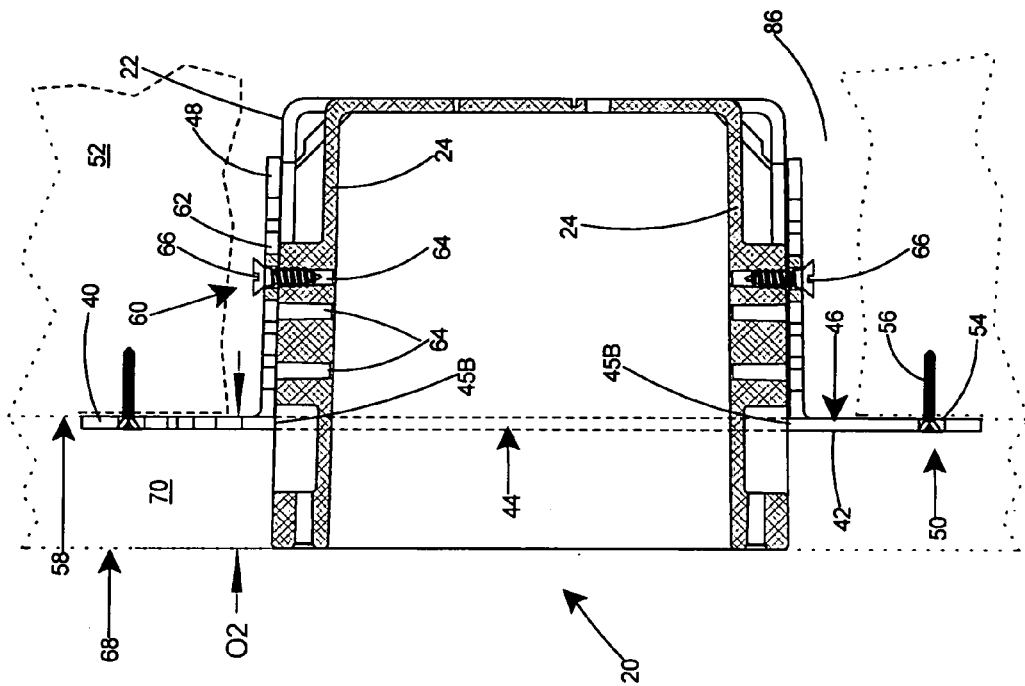
FIG. 11 is a sectional view of the assembly installed on a wall with a second offset from the wall.
Figure 10:
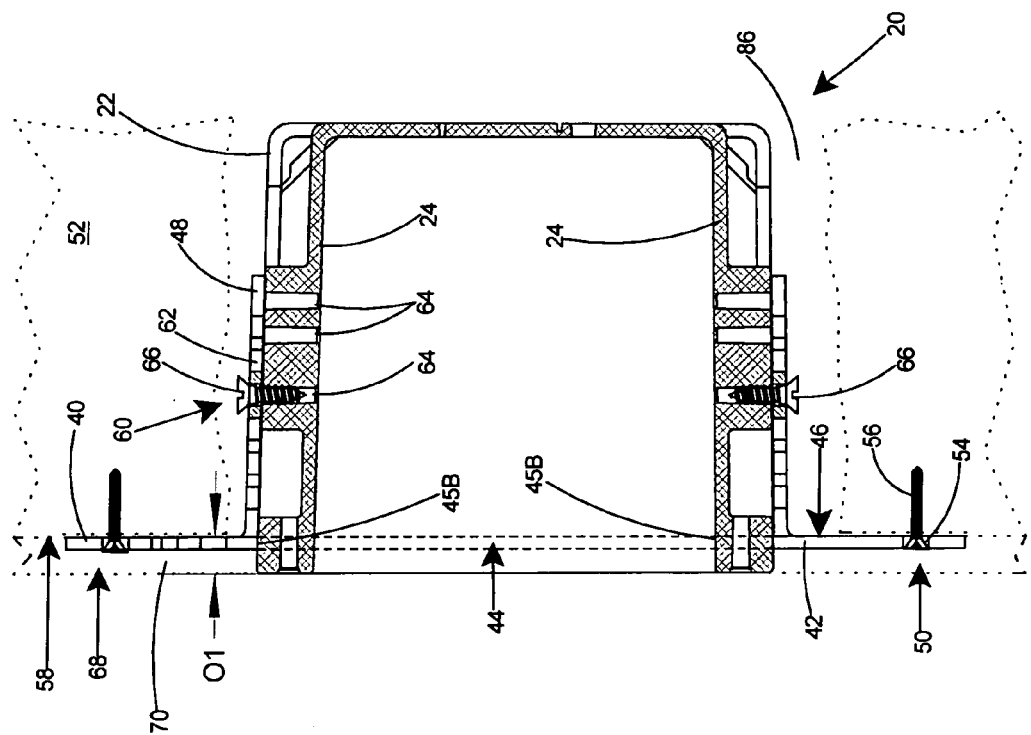
FIG. 10 is a sectional view of the assembly installed on a wall with a first offset from the wall.
Figure 12:
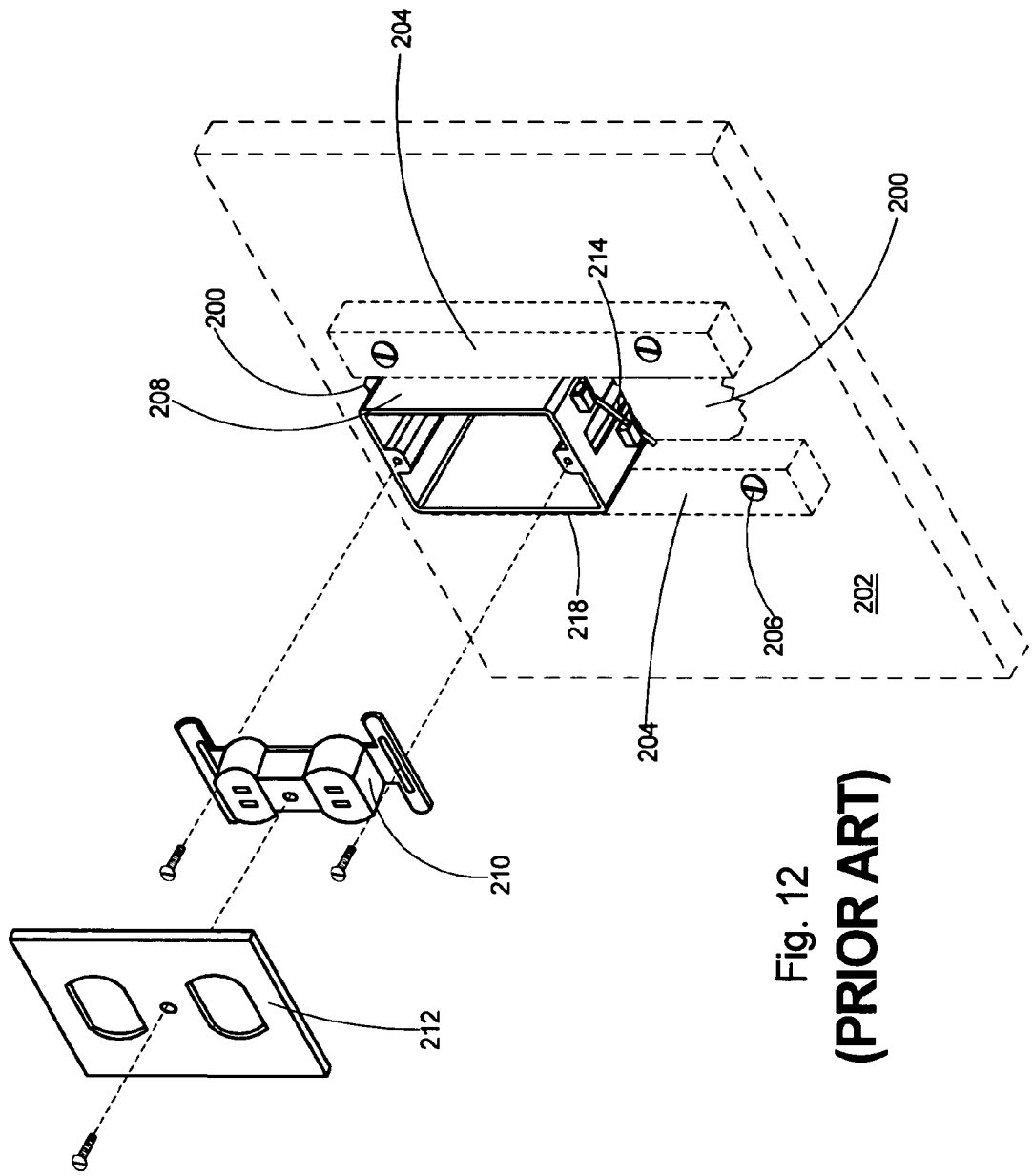
FIG. 12 is an exploded perspective view of a prior art electrical box secured to a furring strip and with electrical components in alignment therewith for installation on a block wall.
Figure 13:
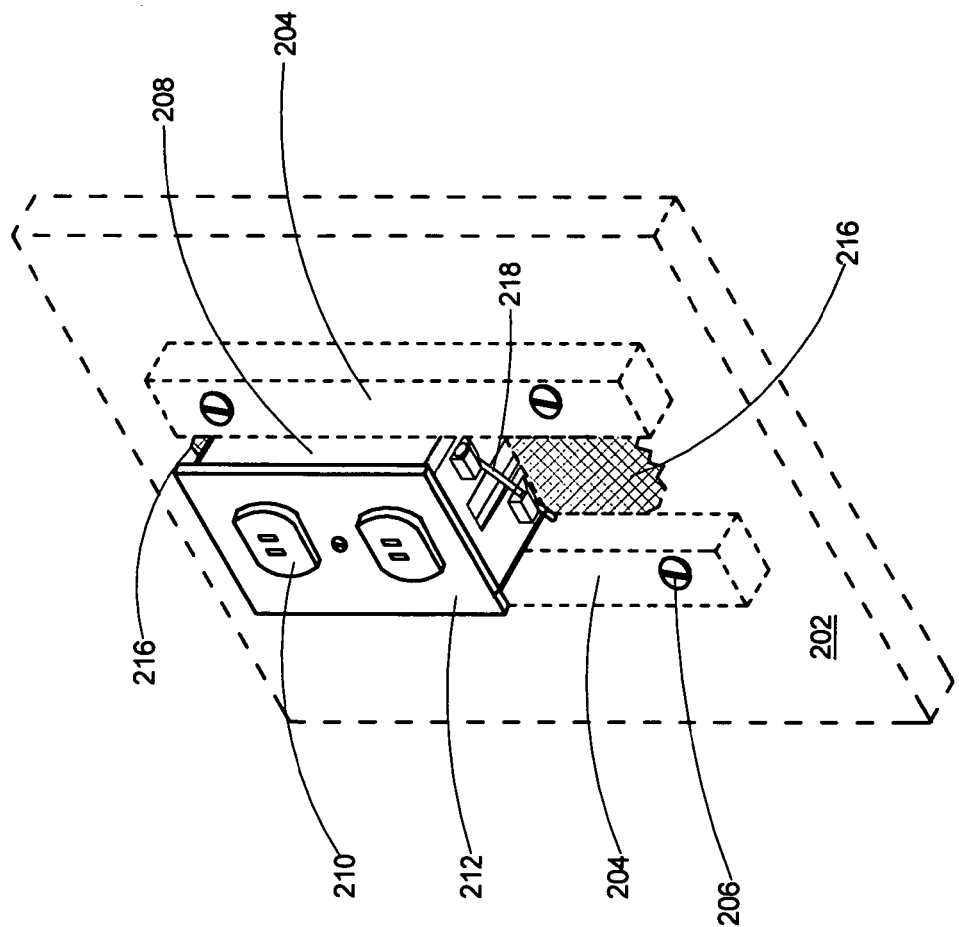
FIG. 13 is a perspective view of the prior art electrical box of FIG. 12 after being installed on a block wall.

The reader is referred to FIGS. 10 and 11 for an understanding of the operation of the electrical box assembly 20 of the present invention. The electrical box 22 and slide member 40 could be provided as separate pieces but more typically would be provided as an assembly 20 (see FIG. 3) with the box 22 and slide member 40 secured together by the fastening and adjustment arrangement 60. When provided as an assembly 20, the box 22 would be secured to the slide member 40 and would include an offset, such as the offset O1 shown in FIG. 10. However, wall finishing materials have various thicknesses, such as ½-inch, 1-inch, 2-inches, and numerous others. Therefore, at the job site, if the job required an offset different than the preset offset, an installer would loosen the fastening and adjustment arrangement 60 and slide the electrical box 22 with respect to the slide member 40 until the desired offset was set. The offset O1 is measured as shown in FIG. 10, from the surface 58 of the unfinished wall 52 to the expected surface 68 of the finishing layer 70. The installer would first make a hole 86 in the wall 52 with the hole 86 preferably larger than the sidewalls 24 of the electrical box 22. With the electrical box 22 secured to the slide member 40 at the desired offset, the electrical box assembly 20 is then inserted into the hole 86 until the rear surface 46 of the flange 42 is flush against the unfinished surface 58. The installation of the electrical box assembly 20 is completed by securing the assembly 20 to the unfinished surface 58 with the mounting arrangement 50, including the mounting fasteners 56 driven through the mounting apertures 54 in the flange 42 and into the wall 52.

As shown in FIG. 11, a larger offset O2 can be set by simply removing the fastener 66 of the fastening and adjustment arrangement 60, sliding the box 22 with respect to the slide member 40 until an appropriate guiding aperture 62 is in axial alignment with an appropriate receiving aperture 64, and securing the fastener 66 into the aligned apertures.

Having thus described the invention with reference to a preferred embodiment, it is to be understood that the invention is not so limited by the description herein but is defined as follows by the appended claims.

What is claimed is:

1. An assembly for providing electrical service on a surface comprising:
   a box having sidewalls, a front opening, a front edge, and a cavity for receiving an electrical device therein;
   a slide member including a flange having a rear surface, and an opening therein;
   an arm extending inwardly from said rear surface of said flange;
   a mounting arrangement on said flange for securing said slide member to said surface;
   said slide member positioned outside of said sidewalls of said box;
   outward extending ribs on said flange, said ribs having a thickness;
   a web extending between each of said ribs of said flange, said webs having a thickness;
   said thickness of said ribs being greater than said thickness of said webs; and
   a fastening and adjustment arrangement including a plurality of guiding apertures in said arm, a plurality of receiving apertures in said sidewalls of said box, and at least one fastener associated with said arm for securing through said guiding apertures in said arm into said receiving apertures in said sidewalls of said electrical box, whereby the offset of said front edge of said box from said surface is determined by the selection and alignment of one of said guiding apertures in said arm with one of said receiving apertures in said sidewalls of said electrical box.

2. The assembly of claim 1 wherein
   said arm includes a first arm and a second arm in parallel planes on opposing sides of said opening in said slide member; and
   each aperture in said plurality of apertures in said first arm are in axial alignment with a matching aperture in said plurality of apertures in said second arm.

3. The assembly of claim 1 wherein said web extends outward at least 0.5 inch from said opening in said slide member.

4. The assembly of claim 1 including
   a plurality of apertures in said web; and
   said apertures in said web include a diameter of at least 0.125 inch and no greater than 0.500 inch;
   whereby said apertures in said web enhance the adherence of stucco when said stucco is applied thereto.

5. An assembly for providing electrical service on a surface comprising:
   a box having sidewalls, a front opening, a front edge, and a cavity for receiving an electrical device therein;
   a slide member including a flange having a rear surface, and an opening therein;
   an arm extending inwardly from said rear surface of said flange;
   a mounting arrangement on said flange for securing said slide member to said surface;
   said slide member positioned outside of said sidewalls of said box;
   a fastening and adjustment arrangement on said arm and on said sidewalls of said box for securing said box to said slide member and for adjusting the distance said front edge of said box is offset from said surface; and
   brace members extending horizontally from each side of said opening in said slide member and extending vertically between said arms of said flange.

6. A method of installing electrical service on a surface including:
   providing a box having sidewalls, a back wall, a front opening, a front edge, and a cavity therein;
   providing a slide member including a flange having outward extending ribs, a rear surface, an opening therein, and an arm extending from said rear surface;
   providing a mounting arrangement on said ribs for securing said slide member to said surface;
   providing a fastening and adjustment arrangement on said arm for securing said box to said slide member and for adjusting the distance said front edge of said box is offset from said surface, said fastening and adjustment arrangement including a plurality of apertures in said arm and a fastener associated with said arm for securing through said arm into said sidewalls of said electrical box;
   making a hole in said surface, said hole larger than said sidewalls of said box;
   selecting a desired offset for said front edge of said box from said surface, said desired offset based upon the thickness of the finishing layer to be installed on said surface;
   setting said front edge of said box is at said desired offset from said rear surface of said flange;
   securing said box to said slide member with said fastening and adjustment arrangement to form an electrical box assembly;
   inserting said electrical box assembly into said hole in said surface until said rear surface of said flange is flush against said surface; and
   securing said electrical box assembly to said surface with said mounting arrangement.

* * * * *